US007545287B2

(12) United States Patent
Feldman et al.

(10) Patent No.: US 7,545,287 B2
(45) Date of Patent: Jun. 9, 2009

(54) ENFORCEMENT TRANSPONDER

(75) Inventors: Ira R. Feldman, Yorba Linda, CA (US); Paul A. Moosie, Mississauga (CA); Brian E. Patno, Fullerton, CA (US)

(73) Assignee: Raytheon Company, Waltham, MA (US)

( * ) Notice: Subject to any disclaimer, the term of this patent is extended or adjusted under 35 U.S.C. 154(b) by 244 days.

(21) Appl. No.: 11/206,554

(22) Filed: Aug. 18, 2005

(65) Prior Publication Data

US 2006/0054680 A1 Mar. 16, 2006

Related U.S. Application Data

(60) Provisional application No. 60/605,749, filed on Aug. 31, 2004.

(51) Int. Cl.
*G08B 26/00* (2006.01)
*G01M 17/00* (2006.01)

(52) U.S. Cl. ...................... 340/928; 701/35; 340/572.1; 340/10.1

(58) Field of Classification Search ................. 340/505, 340/425.5, 426, 902, 928, 905, 7.121, 10.1, 340/825.69, 539, 540, 988, 572.1; 705/13; 364/401; 235/380, 384; 342/457; 701/35, 701/33, 36

See application file for complete search history.

(56) References Cited

U.S. PATENT DOCUMENTS

| | | | | |
|---|---|---|---|---|
| 4,296,400 | A | | 10/1981 | Becker et al. |
| 4,303,904 | A | | 12/1981 | Chasek |
| 4,740,045 | A | * | 4/1988 | Goodson et al. ............ 342/112 |
| 5,086,389 | A | * | 2/1992 | Hassett et al. ................. 705/13 |
| 5,278,563 | A | | 1/1994 | Spiess |
| 5,289,183 | A | | 2/1994 | Hassett et al. |
| 5,310,999 | A | * | 5/1994 | Claus et al. ................. 235/384 |
| 5,485,520 | A | * | 1/1996 | Chaum et al. ................. 705/74 |
| 5,530,447 | A | | 6/1996 | Henderson et al. |
| 5,652,589 | A | | 7/1997 | Ono et al. |
| 5,657,008 | A | | 8/1997 | Bantli |
| 5,767,505 | A | | 6/1998 | Mertens et al. |
| 5,819,234 | A | * | 10/1998 | Slavin et al. ............... 340/10.4 |
| 6,052,068 | A | * | 4/2000 | Price R-W et al. .......... 340/933 |
| 6,081,206 | A | | 6/2000 | Kielland |

(Continued)

FOREIGN PATENT DOCUMENTS

DE 101 26 345 A1 1/2001

(Continued)

OTHER PUBLICATIONS

Proposal for MnPass Project, Submitted to Minnesota Department of Transporation Sep. 2, 2003, 3 pages.

(Continued)

*Primary Examiner*—Benjamin C Lee
*Assistant Examiner*—Sigmund Tang
(74) *Attorney, Agent, or Firm*—Daly, Crowley, Mofford & Durkee, LLP

(57) ABSTRACT

An enforcement transponder system includes an enforcement reader in communication with an enforcement transponder. The transponders are written to identify when and where toll has been collected from a user of a toll road. In one embodiment, the system includes one or more roadside toll collection systems. This allows enforcement/verification of toll collection from SOV traffic on HOT lanes.

20 Claims, 6 Drawing Sheets

U.S. PATENT DOCUMENTS

| | | | | |
|---|---|---|---|---|
| 6,163,277 | A | 12/2000 | Gehlot | |
| 6,191,705 | B1 | 2/2001 | Oomen et al. | |
| 6,359,570 | B1 * | 3/2002 | Adcox et al. | 340/902 |
| 6,388,579 | B1 | 5/2002 | Adcox et al. | |
| 6,408,232 | B1 | 6/2002 | Cannon et al. | |
| RE38,626 | E | 10/2004 | Kielland | |
| 6,801,138 | B2 | 10/2004 | Koike | |
| 7,091,821 | B2 | 8/2006 | Lessard et al. | |
| 2004/0201539 | A1 | 10/2004 | Yewen | |
| 2005/0280508 | A1 | 12/2005 | Mravca et al. | |
| 2006/0022800 | A1 | 2/2006 | Krishna et al. | |

FOREIGN PATENT DOCUMENTS

| | | |
|---|---|---|
| WO | WO 98/49654 | 11/1998 |
| WO | WO 02/63830 A2 | 2/2002 |
| WO | WO 02/63830 A3 | 2/2002 |

OTHER PUBLICATIONS

International Search Report for application No. PCT/US2005/029360 dated Dec. 22, 2005.

International Search Report for application No. PCT/US2005/029405 dated Dec. 14, 2005.

Written Opinion for the ISA for Application No. PCT/US205/029360, Dec. 18, 2005.

Written Opinion for the ISA for Application No. PCT/US205/029405, Dec. 18, 2005.

* cited by examiner

ENFORCEMENT TRANSPONDER

CROSS REFERENCE TO RELATED APPLICATIONS

This application claims the benefit under 35 U.S.C. §119 (e) of U.S. Provisional Application No. 60/605,749 filed Aug. 31, 2004, which application is incorporated herein by reference in its entirety.

STATEMENT REGARDING FEDERALLY SPONSORED RESEARCH

Not Applicable.

FIELD OF THE INVENTION

This invention relates generally to vehicle transponders and more particularly to systems and techniques for establishing transponder classes and transponder/reader systems signaling an enforcement agent following a vehicle through an automated electronic tolling zone.

BACKGROUND OF THE INVENTION

As is known in the art, a toll road is a road on which an agency (either a private agency or a public agency) collects money from users who wish to drive vehicles on the road. Typically, users pay a toll at so-called toll booths located at toll plazas which are established at certain locations along the road. The tollbooths sometimes include a gate which prevents a vehicle from passing through the toll booth unless a toll is paid. Once the toll is paid, the gate is raised to allow the vehicle to pass. Thus, to pay the toll at the tollbooth, the driver typically slows down the vehicle (or stops the vehicle if the toll booth has a gate) at the tollbooth and either pays a person acting as a toll collector or deposits money in a collection bin which registers payment of the toll.

As is also known, there is a trend on toll roads to automate the collection of the toll. Some automated toll collection systems allow electronic payment of the toll. To allow such automated electronic toll payment, users who wish to electronically pay the toll place a transponder in their vehicle. The vehicle transponder communicates with one or more reader systems which are mounted at predetermined locations (typically at toll plazas) along the toll road. Such automated toll systems do not require any gates, barriers or any physical impediments and thus, they free traffic flow on the highway. With this technique, tolling can be accurately and reliably conducted substantially at highway speeds (i.e. vehicles having transponders mounted therein need not slow down significantly or even at all for the toll to be collected).

SUMMARY OF THE INVENTION

In accordance with the present invention, a reader includes an antenna having a first port coupled to a transmit/receive (TR) system. The TR system is coupled to a reader processor adapted to recognize a plurality of classes of transponders. The reader processor is coupled to a storage device adapted to store information provided to the reader from a transponder. With this particular arrangement, the reader is provided as an enforcement reader which is adapted to receive information from a first transponder and to transmit the information to a second different transponder or other device. Once the reader stores information from a first transponder, the reader can transmit the information to a second different transponder via the TR system. Transponder-type classification data can be stored on the transponder in a transponder-type data store.

The transponder is classified according to the data stored in the transponder-type data store. For example, if the data store holds an enforcement class data value, then the transponder is recognized as an enforcement class transponder by an appropriately programmed reader. In some embodiments the enforcement reader provides both tolling and enforcement functions In response to a signal received from a transponder, the reader can identify the transponder as belonging to at least one of a plurality of transponder classes. Depending upon the transponder class, the reader then transmits or otherwise provides certain information to the transponder. In those applications in which the second transponder corresponds to an enforcement class transponder disposed in a law enforcement vehicle, the reader enables an enforcement agent to receive information related to a vehicle of interest having a transponder which communicates with the reader. If the signal received from the transponder does not fall within any known transponder class, the transponder is considered a violator and the reader sends a signal to the enforcement transponder indicating this condition.

In accordance with a further aspect of the present invention, a transponder includes an antenna having a first port coupled to a transmit/receive (TR) system. The TR system is coupled to a transponder processor which in turn is coupled to a transponder-type data store. With this particular arrangement, a transponder adapted to hold transponder-type classification data is provided. The transponder-type classification can be stored in the transponder-type data store. The transponder is classified according to the data stored in the transponder-type classification store. For example, if the data store holds an enforcement class data value, then the transponder is recognized as an enforcement class transponder by an appropriately programmed reader.

Depending upon the class to which the transponder belongs, the transponder receives a certain set of information from a reader. For example, if the transponder corresponds to an enforcement transponder, then the transponder receives information of interest to an enforcement agent. The transponder can belong to one or more of a plurality of classes in a transponder classification scheme. Transponder classification classes include, but are not limited to, an enforcement class, a safety class, a toll class, a commercial vehicle class, and a government class. In those applications in which the transponder is disposed in a law enforcement vehicle, the transponder and an appropriately programmed reader provide an enforcement system.

In accordance with a still further aspect of the present invention, a toll system includes at least one roadside toll collection unit (RTCU) adapted to be disposed proximate a road and to be in communication with one or more transponders. The RTCU includes an RTCU reader for communicating with transponders and collecting tolls and means for communicating with a host toll system. The RTCU is also adapted to identify transponder classes in response to information transmitted or otherwise received by or provided to the RTCU. The toll system may optionally include a separate reader disposed to communicate with the RTCU. With this particular arrangement, a toll system which allows communication with an enforcement agent (e.g. a police officer, or other enforcement agent) via an enforcement transponder is provided. By placing an enforcement transponder in a vehicle with the enforcement agent, the enforcement agent receives information as to whether other vehicles have properly paid a toll. In some embodiments, the RTCU can be portable thereby allowing toll zones to be established along different roadways or along different portions of the same roadway.

In one embodiment, a first transponder in a first vehicle passing through a toll zone communicates with a reader. The reader stores at least some of the information received from the transponder in a reader storage device and also provides toll related information to further processing systems for toll deduction processing. An enforcement transponder in a second vehicle passing through the toll zone communicates with the reader. The information passed to the enforcement transponder is in the form of a message that causes the enforcement transponder to signal the driver of the vehicle in which the enforcement transponder is disposed. Optionally, once the reader identifies the transponder as an enforcement transponder and the reader provides to the enforcement transponder the information concerning the first transponder stored in the reader storage device.

In another embodiment, the system includes one or more fixed Roadside Toll Collection (RTC) sites established proximate so-called High Occupancy Toll (HOT) lanes (also sometimes referred to as "diamond lane" segments) of a roadway. Each site utilizes a reader for communications with vehicle equipped transponders. The reader is an automatic vehicle identification device that transmits and receives radio frequency (RF) data to/from transponder equipped vehicles. The reader works in conjunction with a Roadside Controller Unit (RCU) to pass information read from a vehicle transponder to a central computer system for collection of tolls. The reader transmits information to the transponders to identify when and where a toll has been collected from the transponder for enforcement purposes. The transponders can optionally include means for providing one or more signals (e.g. including but not limited to visual signals, sound signals and mechanical signals) to the driver to indicate that a toll has been collected. With this particular arrangement, the system can be operated to allow use of Single Occupancy Vehicle (SOV) traffic within High Occupancy Toll (HOT) lanes by collecting a toll from SOV users using the one or more fixed Roadside Toll Collection (RTC) sites. That is, RTC's allow users not having the requisite number of persons in the vehicle to otherwise allow use of the HOT lane to pay a toll to use the HOT lane. The system can also include one or more RTC sites servicing two directions of a reversible segment of the roadway. allows an enforcement agent to verify that an SOV user of an HOV lane not only has a valid In accordance with a still further aspect of the present invention, a technique which transponder, but that a toll was appropriately collected from the SOV user includes retrieving information from a vehicle transponder and providing the information to an enforcement transponder. With this particular arrangement, an enforcement officer can verify that a toll was collected without having to stop the vehicle in question.

In accordance with a still further aspect of the present invention, an enforcement transponder comprises a transponder program data store having stored therein data which indicates its classification in one of a plurality of transponder classes. One class of transponders are so-called "enforcement class" or "enforcement type" transponders. The transponder program data store can be provided as part of the enforcement transponder or can be installed in an enforcement vehicle belonging to an enforcement agent and communicated to the enforcement transponder.

Enforcement transponders, on the other hand, communicate with appropriately programmed readers (e.g. enforcement readers). This is in contrast to conventional transponders (also sometimes referred to herein as "toll transponders") which identify the holder of the transponder for the purpose of collecting a toll. Conventional transponders communicate with readers which implement the toll collecting function. Enforcement transponders receive from the readers information of interest to enforcement agents and provide the information received from the readers to an enforcement agent. The enforcement transponder provides, for example, information concerning whether a vehicle traveling proximate the enforcement agent's vehicle has been appropriately tolled.

The enforcement reader processes signals provided thereto to identify enforcement transponders and then provides to the enforcement transponder information about a vehicle which may be of interest to the enforcement agent (e.g. whether the vehicle has been properly tolled). To provide tolling information to an enforcement transponder, whenever a transponder (e.g. an SOV Transponder) passes through a tolling zone, the reader keeps track of the time the transponder was read, whether it was a valid transponder and whether a toll was appropriately collected. When an enforcement agent having a transponder passes through the toll zone, the reader identifies that transponder's classification data as indicating that the transponder is designated as an enforcement transponder. Rather than collecting tolling information from the enforcement transponder, the reader compares the current time with the time the last transponder passed through the toll zone. If this time is within a defined time limit that indicates the transponder belongs to a vehicle in relatively close proximity to the enforcement agent vehicle (e.g. immediately in front of the enforcement agent), the reader will then write a command to the enforcement transponder, which will cause the transponder to signal the enforcement agent to indicate that the vehicle ahead was (or was not) validly tolled. If the enforcement agent receives an appropriate signal while following the vehicle in question through the tolling zone, the agent need not stop the driver to learn the information of interest. Conversely, if the time was outside the valid limit, or the last read transponder prior to the enforcement transponder was not a valid transponder, the enforcement transponder would not receive the approve notification, indicating to the enforcement agent that the there is no valid transponder in the vehicle ahead of him. Alternatively, the enforcement transponder could receive a signal which indicated that the transponder in the subject vehicle was not valid or that the toll was not paid.

BRIEF DESCRIPTION OF THE DRAWINGS

The foregoing features of the invention, as well as the invention itself may be more fully understood from the following detailed description of the drawings, in which.

DESCRIPTION OF THE PREFERRED EMBODIMENTS

Figure 1:
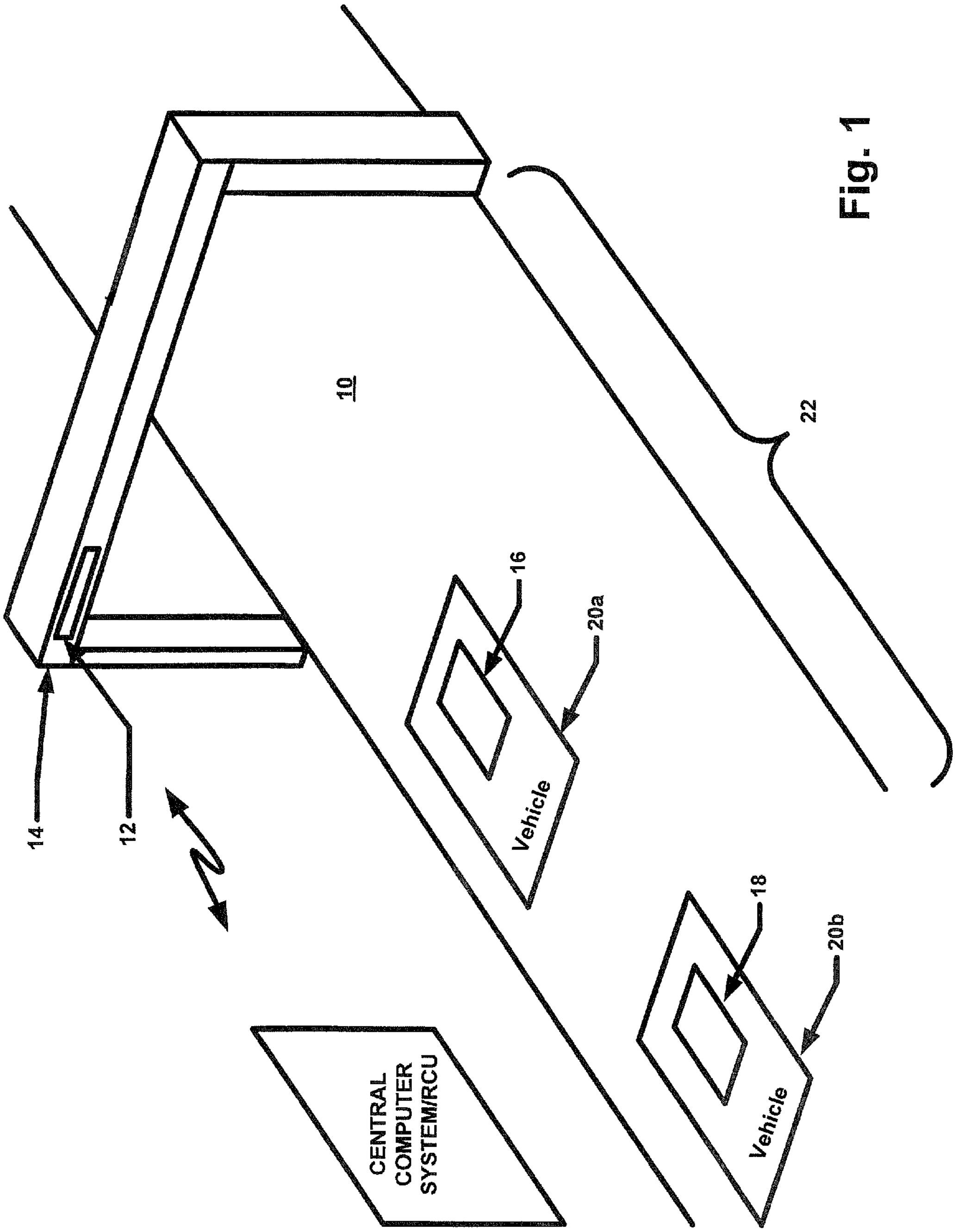
FIG. 1 is a block diagram of a toll collection system utilizing enforcement transponders.

Referring now to FIG. 1, a roadway 10 has a reader 12 located on a structure 14 in a manner which allows the reader to communicate with transponders 16, 18 located in respective ones of vehicles 20*a*, 20*b*. In some embodiments, only a reader antenna is coupled to structure 14 while the reader itself is placed elsewhere (e.g. not on structure 14) and is coupled to the antenna reader via a signal path (e.g. a wired or wireless signal path). In other embodiments, the entire reader is disposed on structure 14. It should be appreciated that while two transponders 16, 18 and two vehicles 20*a*, 20*b* are shown on the roadway 10 in FIG. 1, in practice a relatively large number of vehicles and transponders may be traveling on the roadway. The reader mounting structure 14 may, for example, be provided as an existing roadway structure (e.g. a bridge overpass, an existing sign structure, etc . . . ) or as a specially designed mounting structure. The region of the roadway in which the reader 12 is able to communicate with the transponders is referred to as a toll collection zone 22 (or more simply, a "toll zone" or "toll region"). Thus, the size of the toll region is defined by the communication range of the transponder and reader.

In the example of FIG. 1, the transponder 16 corresponds to a conventional transponder (also referred to as a "toll transponder"). When the vehicle in which the toll transponder 16 is disposed enters the toll region 22, the reader communicates with the transponder and typically a central computer/toll collection system 26 to properly deduct the toll and maintain a record of the toll deducted from each toll transponder passing through the toll zone (toll transponder 16 being one example of a plurality of toll transponders which pass through the toll zone).

The transponder 18, on the other hand, includes a transponder type data store. The transponder type data store may be provided as part of the transponder 18 or may be provided as part of the vehicle 20*b* in which the transponder 18 is disposed. In the case in which the transponder type data store is provided as part of the vehicle (rather than as part of the transponder itself) the transponder type data store is coupled to the transponder 18 such that the transponder type data store and transponder are in communication when the transponder is disposed in the vehicle. In the case of either an external or internal transponder type data store (i.e. external to the transponder itself or internal to the transponder), the transponder type data store has stored therein a value which represents a transponder class. The value stored in the transponder type data store identifies the transponder as belonging to one or more specific classes of transponders.

In the embodiment of FIG. 1, the transponder type data store has stored therein a transponder type data value which indicates that transponder 18 belongs to an enforcement class of transponders. Thus, when the reader 12 receives signals from the transponder 18, the reader identifies the transponder as an enforcement class transponder 18 or more simply an enforcement transponder.

The enforcement transponder 18 is typically disposed in an enforcement vehicle operated by an enforcement agent (not visible in FIG. 1) such as a police officer, a safety officer or other agent. Thus, the vehicle 20*b* corresponds to an enforcement vehicle. It should be appreciated, however, that transponder 18 may be disposed in any type of vehicle.

When a vehicle in which an enforcement transponder is disposed (e.g. enforcement vehicle 20*b*) enters the toll region, the reader receives information which identifies the transponder as an enforcement class transponder. If the enforcement vehicle enters the toll zone within a predetermined period of time after a toll transponder was read by the reader, then the reader provides to the enforcement transponder information concerning the last toll transponder. For example, the reader can provide to the enforcement transponder information including but not limited to whether the toll transponder is valid and whether the toll was properly paid. The reader will provide to the enforcement transponder information concerning the last toll transponder regardless of where the enforcement transponder enters toll region. The reader, however, compares the time the enforcement transponder entered the toll region to the time the last toll transponder entered the toll region as part of the criteria in determining whether to signal the enforcement transponder (or in determining what type of signal to provide to the enforcement transponder). If the reader determines that the enforcement transponder entered the toll region within a predetermined period of time of the toll transponder entering the toll region then the reader provides information to the enforcement transponder.

Those of ordinary skill in the art will appreciate, of course, that many techniques can be used to determine if the enforcement transponder entered the toll region within a certain amount of time after a toll transponder. For example, absolute time at which the toll region was entered can be recorded for both the toll transponder and the enforcement transponder and a difference value between the two times can be computed. Alternatively, a countdown approach can be used in which the reader begins to countdown (e.g. from five seconds to zero) after reading a toll transponder. If the enforcement transponder enters the toll region before the reader completes the countdown (e.g. before the reader counts down from five to zero), then the reader provides information to the enforcement transponder.

Alternatively still, a count-up counter can be used. In this approach, the enforcement transponder must enter the toll region before the reader counts up to a certain value (e.g. a five second count).

It should also be appreciated that the time period may be counted when the reader first reads the transponder. Other approaches or events may also be used to trigger the beginning of the time counting period.

It should also be appreciated that the system can be operated such that the enforcement vehicle can enter the toll region either before, after or at the same time as the toll transponder.

The enforcement transponder then provides the information to the enforcement agent in the vehicle. The enforcement transponder can provide the information via a visual, audio or mechanical signal. For example, information may be displayed on a display screen of a personal digital assistant (PDA) or information can be conveyed to an enforcement agent via a speaker or a vibration mechanism or other mechanical system. In one embodiment, an enforcement transponder has an audible and visual indicator triggered by a message sent to the transponder by the reader.

In general, whenever an enforcement transponder enters a toll zone, the reader checks the time when the last toll transponder entered the same toll zone and if the time was within a threshold window of time, the reader alerts the enforcement transponder. In some embodiments, the time criteria is coupled with other information read from the toll transponder and multiple criteria must be met (e.g. the transponder is valid and a toll was collected). This allows an enforcement officer to verify that a toll was collected without having to pull over the vehicle in question.

It should be appreciated that although the transponder classification scheme has been described hereinabove with respect to an enforcement class and an enforcement transponder application, other transponder classes and applications are also possible. Some exemplary transponder classes include but are not limited to: a safety transponder class, an emergency transponder class, a toll transponder class, a commercial vehicle transponder class and a government official transponder class.

Figure 1A:
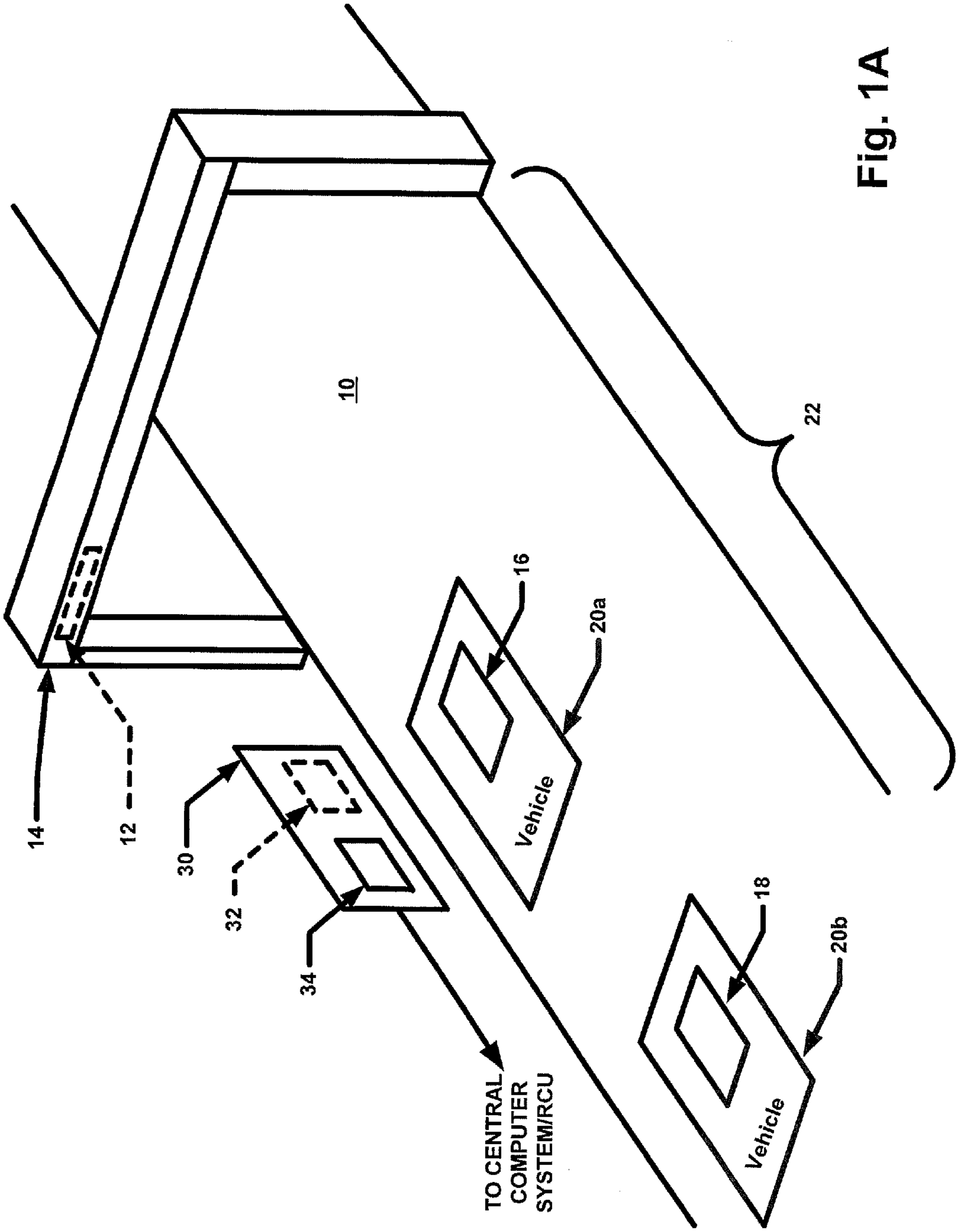
FIG. 1A is a block diagram of an automated toll collection system having roadside toll collection units.

Referring now to FIG. 1A, in which like elements of FIG. 1 are provided having like reference designations, one particular embodiment an enforcement transponder system includes one or more fixed roadside toll collection (RTC) units 30 at so-called RTC sites. The RTC sites serve so-called "diamond lane" segments of a roadway. Diamond lane segments are reserved for use by vehicles having more than one person therein. Single Occupancy Vehicle (SOV) traffic can use High Occupancy Toll (HOT) lanes upon payment of a toll by the SOV. The system enables enforcement/verification of toll collection from SOV traffic in HOT lanes.

Each RTC unit utilizes a reader, also sometimes referred to as a Dedicated Short Range Communications (DSRC) Transceiver, for communications with vehicle equipped transponders (also sometimes referred to as DSRC Transponders). It should be appreciated that the reader may be provided as part of the RTC unit (as illustrated by reader 32 in FIG. 1A) or the reader may be physically separate from the RTC unit (e.g. mounted on a mounting structure as illustrated by reader 12).

The DSRC Transceiver is an automatic vehicle identification device that transmits and receives radio frequency (RF) data to/from transponder-equipped vehicles. The reader works in conjunction with a Roadside Controller Unit (RCU) 34 to pass information read from the transponder to a central computer system for collection of tolls. The transponders are written to identify when and where toll has been collected from the user. The transponders also provide signaling to the driver via lights and/or buzzers built into the transponder to indicate whether a toll has been collected.

When the vehicle containing the toll transponder enters the toll region 22 defined by the range of the reader, a toll is deducted from the toll transponder (e.g. toll transponder 16). The reader typically communicates with the toll transponder and the RCU (and or a central computer/toll collection processing system) to properly deduct the toll and maintain a record of the toll deducted from each toll transponder passing through the toll zone (toll transponder 16 being one example of a plurality of toll transponders which pass through the toll zone).

The enforcement transponder 18 in vehicle 20*b* communicates with the RCU via the reader when the vehicle 20*b* enters the toll zone. If the enforcement vehicle 20*b* enters the toll zone within a predetermined time after the vehicle containing the toll transponder last read by the reader, and the transponder is valid and that a toll was collected from it, then the reader provides to the enforcement transponder information concerning the last toll transponder. For example, the reader can provide to the enforcement transponder information including but not limited to whether the toll transponder is valid and whether the toll was properly paid. The enforcement transponder then provides the information to the enforcement agent in the vehicle. The enforcement transponder can provide the information via a visual, audio or mechanical signal. For example, an LED display, a display screen of a personal digital assistant (PDA) can be used or a speaker or a vibration mechanism or a beeper can be used to convey information to the enforcement agent.

By establishing RTC sites with the RCU, it is possible to establish toll zones along different portions of roadways (including but not limited to off ramps and rest areas) without erecting toll structures such as toll booths and toll gates. It should be noted that multiple RTC sites may be coupled to the RCU. Thus, the system enables a technique which allows an enforcement agent to verify that an SOV user of an HOV lane not only has a valid transponder, but also that a toll was appropriately collected from the SOV user. This allows an enforcement officer to verify that a toll was collected without having to pull over the vehicle in question.

Figure 2:
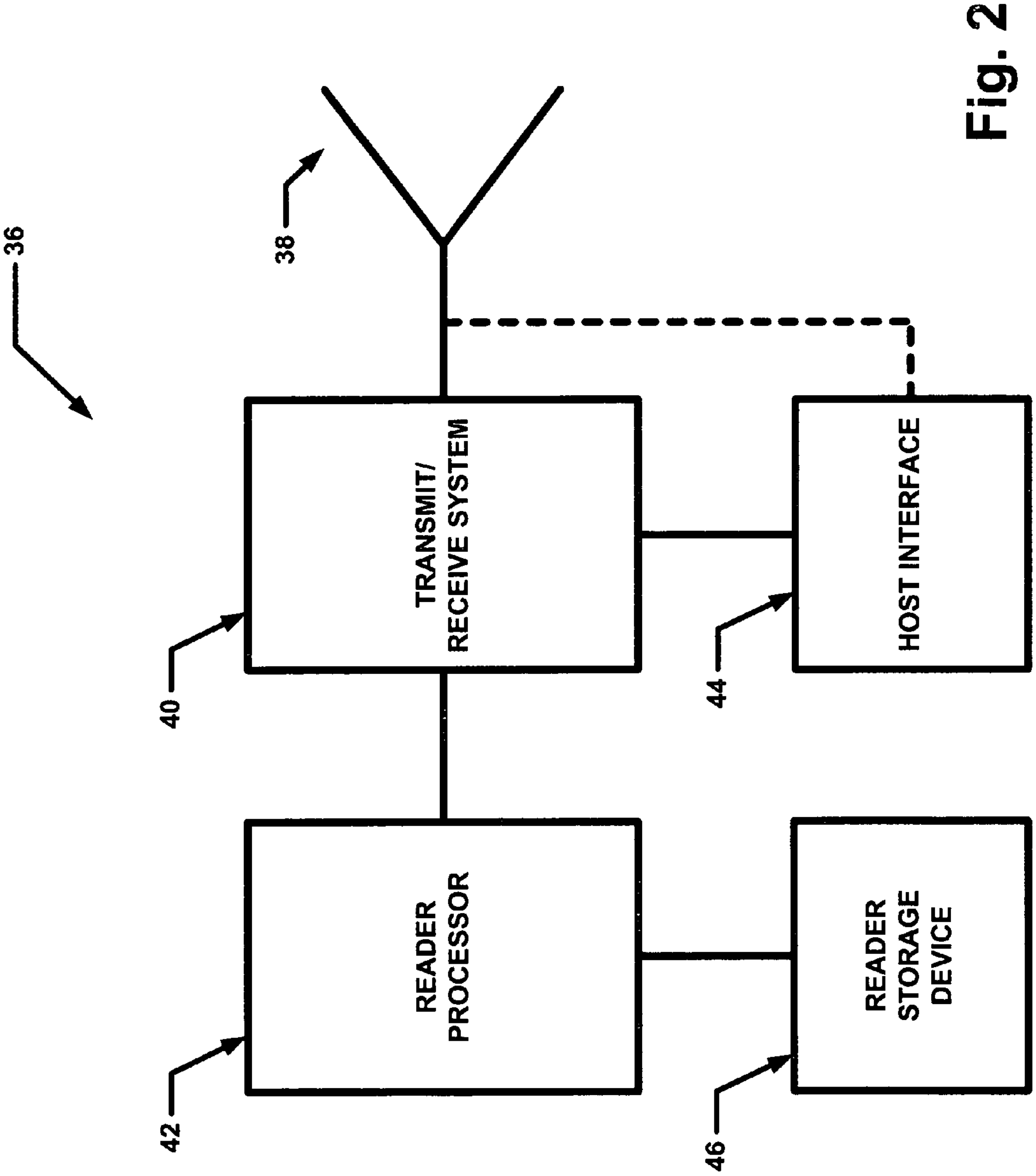
FIG. 2 is a block diagram of an enforcement reader.

Referring now to FIG. 2, an enforcement reader 36 includes an antenna 38 coupled to a transmit/receive system 40. The transmit/receive system 40 is coupled to a reader processor/state machine 42 and a host interface 44. The host interface may optionally be coupled directly to the antenna 38. The reader includes a reader storage device in which is stored information received from transponders in communication with the reader.

The antenna and T/R system 40 receive signals from the transponders and provide the signals to the reader processor 42. The reader processor is adapted to process signals provided thereto and recognize or otherwise determine the classification of the transponder.

When the reader processor recognizes a toll class transponder, the processor stores certain data from the toll transponder into the reader storage device and provides toll transponder processing.

The storage device thus has stored therein data from the last transponder to pass thereby. The data stored in the storage device may at least include transponder type data associated with a transponder.

When the reader processor recognizes an enforcement transponder, the processor also performs enforcement processing as will be described below in conjunction with FIGS. 4 and 4A.

Regardless of the type of transponder, the reader processor provides information to the host interface and the information is then communicated to the transponder.

The host interface receives transponder information from the reader processor and this information can be communicated to further processing equipment (not shown in FIG. 2) for toll collection purposes. In some cases the processing equipment (e.g. an RCU) can also communicate information to the reader via the host interface. Such information may, for example, be tolling information (e.g. that the RCU collected a toll), or may be reader operational instructions.

Figure 3:
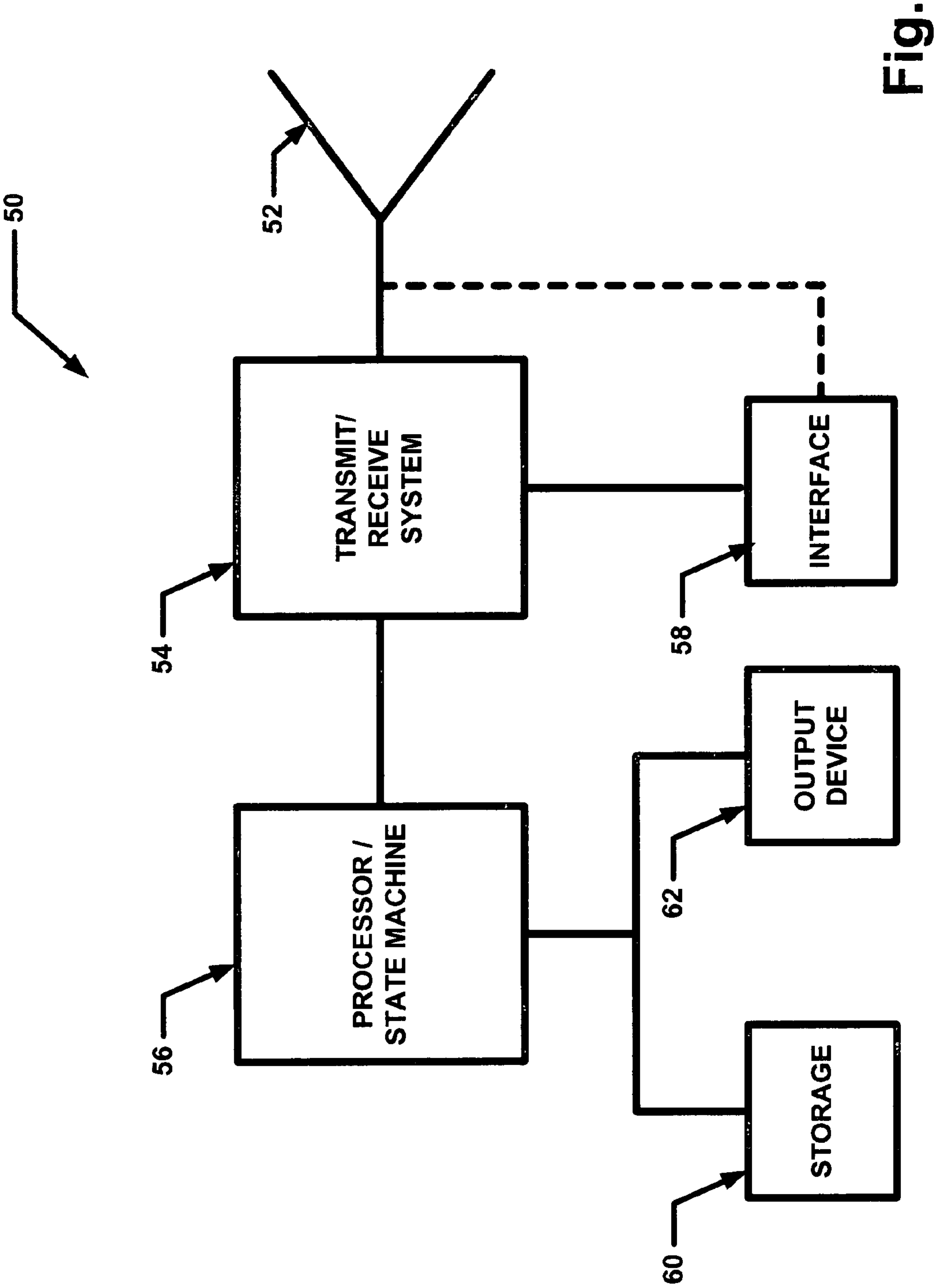
FIG. 3 is a block diagram of an enforcement transponder.

Referring now to FIG. 3, an enforcement transponder 50 includes an antenna 52 coupled to a transmit/receive system 54. The transmit/receive system 54 is coupled to a processor/state machine 56 and a transponder type data store 60 in which is stored one or more transponder class values.

In this particular example, the transponder class value stored in the transponder type data store corresponds to an enforcement class and thus the transponder 56 corresponds to an enforcement transponder. It should be appreciated, however, that other transponder class values may be stored in the transponder type data store. Thus, although this particular transponder has an enforcement class value stored in the transponder type data store, (hence identifying the transponder as an enforcement class transponder), other transponder classifications could also be stored in the transponder type data store such as those mentioned above. It should also be appreciated that in some embodiments a transponder may have more than one transponder class value stored in the transponder class data store (i.e. a transponder may belong to more than one transponder class).

Also coupled to the processor 56 is an output device 62. Output device 62 may correspond to a display (e.g. an LED or the display of a PDA or other type of display) which provides information to a user (e.g. an enforcement agent). The output device may also provide audio or mechanical (e.g. vibration) output signals rather than visual signals.

As described above, conventional or toll transponders are used for the purpose of collecting toll. Enforcement transponders on the other hand, are used to relay information to the enforcement agent to identify whether the vehicle traveling in front of him has been appropriately tolled. In addition to the specially identified transponder, the enforcement transponder application includes processing within the reader to signal the enforcement transponder that the vehicle proximate the enforcement agent (e.g. in front of the enforcement agent) has been properly tolled.

To accomplish this, whenever a valid transponder (e.g. an SOV transponder) passes through the tolling zone, the reader will keep track of the time the transponder was read, and whether it was a valid transponder and toll was appropriately collected. When an enforcement agent passes through the toll zone, the reader identifies its agency data (i.e. transponder type data) as indicating it is designated as an enforcement transponder. And, rather than collecting tolling information, the reader compares the current time with the time of the last valid transponder that had toll appropriately collected (as discussed above, other techniques for determining whether two vehicles entered the toll zone within a window of time may also be used).

In one particular embodiment, if the time is within a defined limit (or window of time) that indicates the transponder belongs to the vehicle in front of the enforcement agent, the reader causes the enforcement transponder to signal the enforcement agent to indicate that the vehicle ahead was validly tolled. If the enforcement agent receives the appropriate signal while following the vehicle in question through the tolling zone, the agent does not need to pull over the driver. Conversely, if the time was outside the valid limit, or the last read transponder prior to enforcement transponder was not a valid transponder, the enforcement transponder would not receive the approve notification, indicating to the enforcement agent that the there is no valid transponder in the vehicle ahead of him.

Figure 4:
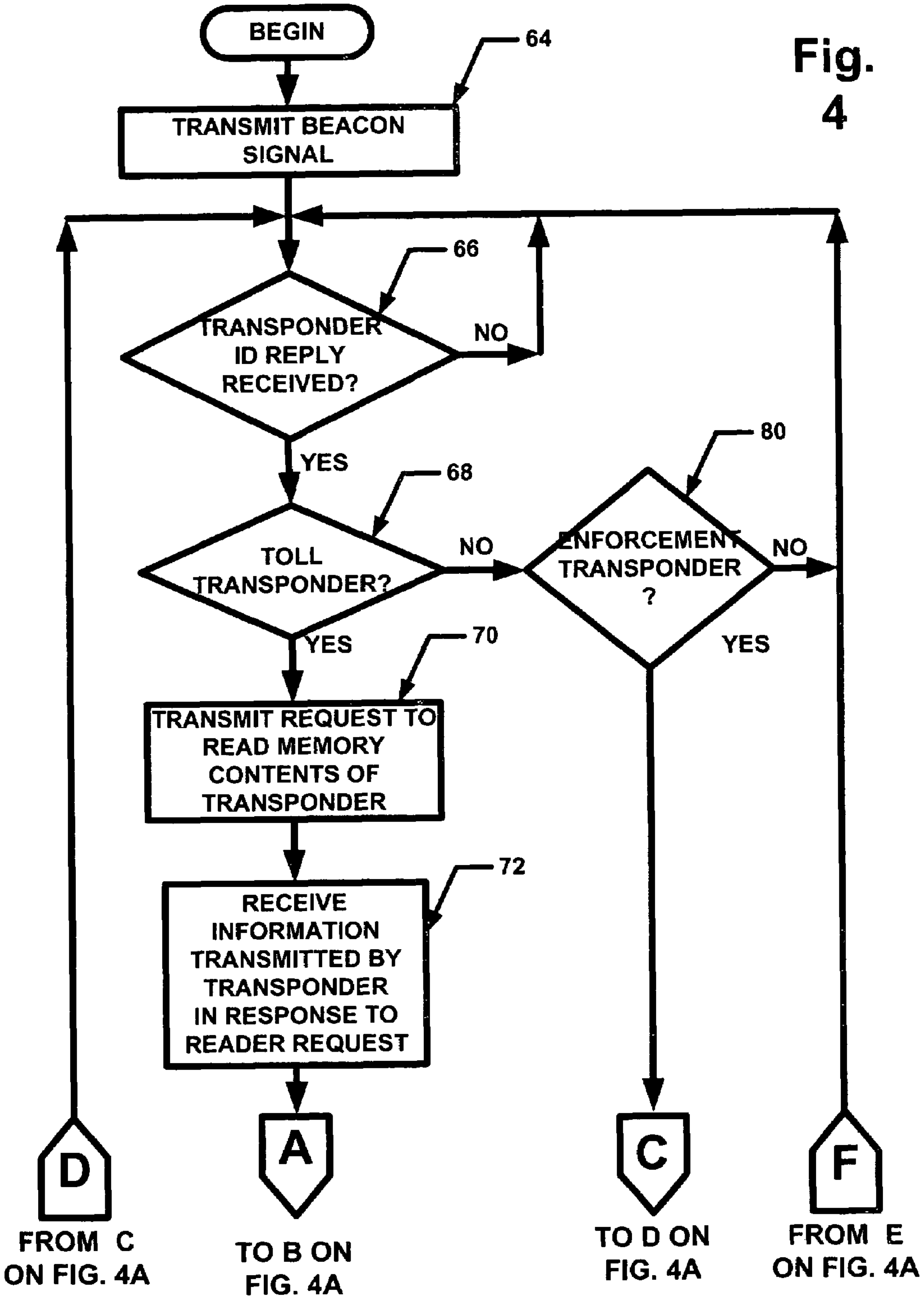
FIGS. 4 and 4A are a series of flow diagrams illustrating certain aspects of the processing performed in an enforcement transponder.
Figure 4A:
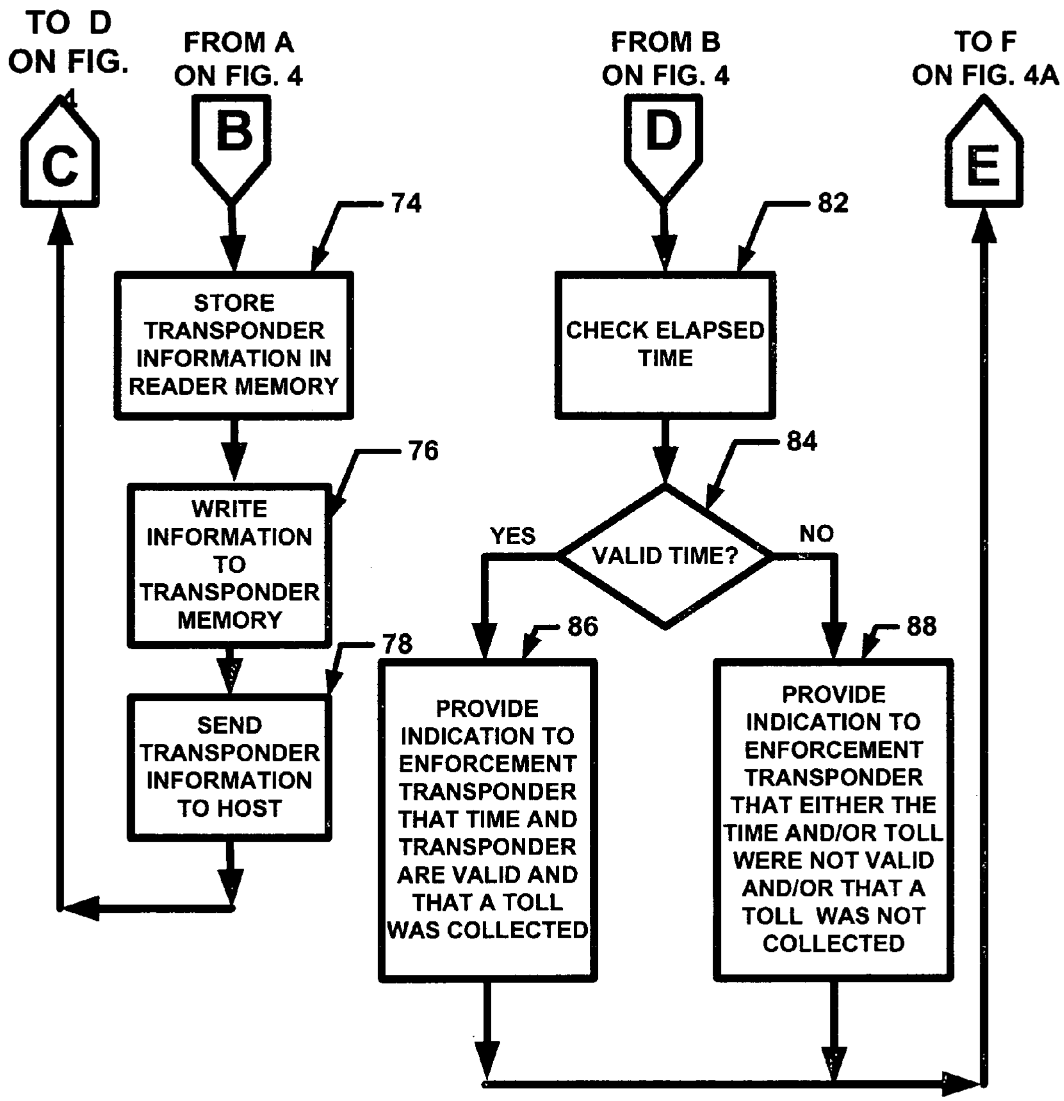

FIGS. 4 and 4A are a series of flow diagrams showing the processing performed by an enforcement transponder provided as part of automated system such as the systems described above in conjunction with FIGS. 1 and 1A. The rectangular elements (typified by element 64 in FIG. 4), are herein denoted "processing blocks," and represent computer software instructions or groups of instructions. The diamond shaped elements (typified by element 66 in FIG. 4A), are herein denoted "decision blocks," and represent computer software instructions, or groups of instructions which affect the execution of the computer software instructions represented by the processing blocks.

Alternatively, the processing and decision blocks represent processing performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown.

It will be appreciated by those of ordinary skill in the art that unless otherwise indicated herein, the particular sequence of steps described is illustrative only and can be varied without departing from the spirit of the invention.

As shown in block 64, processing begins with a reader emitting a beacon signal. Decision block 66 implements a loop in which the reader continually checks for a transponder reply identifier signal. If the reader receives a transponder reply signal, then processing proceeds to decision block 68 in which a decision is made as whether the transponder is a toll transponder or an enforcement transponder.

If a decision is made that the transponder is a toll transponder, then processing proceeds to processing block 70 in which the reader requests information from the toll transponder. Processing then flows to processing block 72 in which the reader receives information from the transponder. The reader receives certain information from the transponder in response to the request and stores the information in a reader storage device as shown in processing block 74. The reader also causes information to be stored in a transponder memory as shown in processing block 76. The information stored in the transponder memory may correspond, for example, to a time stamp indicating when a toll was paid (i.e. the time), where the toll was collected (i.e. the location) and optionally the amount of the toll that was paid. Other information may also be stored in the transponder memory.

In processing block 78, the reader transmits or otherwise provides the transponder information to a host processor which tracks tolling identity and information for each transponder. Processing then returns to the loop implemented by decision block 66.

If in decision block 68, a decision is made that the transponder is not a toll transponder, then processing proceeds to decision block 80 where a decision is made as to whether the transponder is an enforcement transponder. If in decision block 80 a decision is made that the transponder is not an enforcement transponder, then processing flows to the loop implemented by decision block 66. If, on the other hand, a decision is made that the transponder is an enforcement transponder, then processing flows to processing block 82 where the time which has elapsed between the time when the reader received a reply from the enforcement transponder and the time when the reader read the last toll transponder is computed. If the time is within a predetermined period of time, and if toll was collected from the transponder and the transponder is valid, then as shown in decision block 84 processing proceeds to processing block 86. In processing block 86, the reader provides to the enforcement transponder an indication that the time is valid and also provides an indication that toll was collected.

Once the enforcement transponder has the information. The enforcement transponder can convey the information to an enforcement agent using the transponder and the enforcement agent can decide what action to take, if any, with respect to the subject vehicle.

If in decision block 84 a decision is made that the elapsed time is not within the predetermined period of time or that the transponder was not valid or that the toll was not paid, then processing flows to processing block 88 where the reader provides to the enforcement transponder an appropriate indication. The reader may still transmit or otherwise provide to the enforcement transponder information concerning the previous toll transponder stored in the memory. In either case (i.e. whether processing block 86 or 88 is performed), processing again flows to the loop implemented by decision block 66.

All references cited herein are hereby incorporated herein by reference in their entirety.

Having described preferred embodiments of the invention, it will now become apparent to one of ordinary skill in the art that other embodiments incorporating their concepts may be used. For example, although as described herein the reader only signals the enforcement transponder, the reader could store information in it based upon what was read from a previous transponder. Also, the reader could transmit or otherwise provide instructions to cause an enforcement (or other transponder) to perform a desired function. It is felt therefore that these embodiments should not be limited to disclosed embodiments, but rather should be limited only by the spirit and scope of the appended claims.

What is claimed is:

1. A system comprising:

an enforcement reader configured to read, from a first transponder, information of interest to an enforcement agent; and an enforcement transponder configured to receive from the enforcement reader the information of interest and to provide, using a signal, the information of interest received from the enforcement reader to the enforcement agent to determine an enforcement action associated with the first transponder.

2. The system of claim 1 wherein the enforcement reader comprises:

an antenna;

a transmit/receive (TR) system coupled to the antenna;

a storage device adapted to store information provided to the enforcement reader from a first transponder; and a reader processor coupled to the TR system and said storage device, said reader processor configured to process information received from the enforcement transponder.

3. The system of claim 2 wherein the enforcement transponder comprises:

an antenna;

a transmit/receive (TR) system coupled to the antenna;

a transponder type data store having stored therein an enforcement type transponder class value; and a transponder processor coupled to the TR system, and the transponder type data store.

4. An enforcement reader comprising:

an antenna;

a transmit/receive (TR) system coupled to the antenna;

a storage device configured to store information provided to the enforcement reader from a first transponder, the stored information being of interest to an enforcement agent; and a reader processor coupled to the TR system and the storage device, wherein the enforcement reader is configured to provide the stored information to an enforcement transponder that provides, using a signal, the stored information to the enforcement agent to determine an enforcement action associated with the first transponder.

5. The reader of claim 4 wherein the reader processor is configured to process the stored information for use by the enforcement agent.

6. An enforcement transponder comprising:

an antenna;

a transmit/receive (TR) system coupled to said the antenna;

a transponder type data store configured to store a transponder class value, which indicates a particular type of transponder; and a transponder processor coupled to the TR system, and the transponder type data store, wherein the enforcement transponder is configured to receive information of interest to an enforcement agent from an enforcement reader read from a first transponder, wherein the enforcement transponder provides, using a signal, the information of interest received from the enforcement reader to the enforcement agent to determine an enforcement action associated with the first transponder.

7. The enforcement transponder of claim 6 wherein the transponder class value comprises at least one of:

an enforcement class value;

a toll class value;

a safety class value;

a commercial vehicle class value; and a government class value.

8. A process for operating an enforcement reader, the process comprising:

receiving, by the enforcement reader, information from a toll transponder;

processing the information from the toll transponder to generate an output indicator; and relaying the information received from the toll transponder to an enforcement transponder configured to provide, using a signal, the relayed information to an enforcement agent to determine an enforcement action associated with the toll transponder, wherein the relayed information is of interest to the enforcement agent.

9. The process of claim 8 further comprising storing, in the enforcement reader, information received from the toll transponder.

10. A process for operating an enforcement reader, the process comprising:

receiving, by the enforcement reader, information from a toll transponder;

receiving information from an enforcement transponder;

processing the information from the toll transponder to generate an output indicator signal, the output indicator signal representing information of interest to an enforcement agent; and providing the output indicator signal to the enforcement transponder to the enforcement agent to determine an enforcement action associated with the toll transponder.

11. The process of claim 10 wherein receiving information from a toll transponder comprises receiving toll information.

12. The process of claim 11 wherein receiving information from an enforcement transponder comprises receiving an enforcement class value from the enforcement transponder.

13. The process of claim 12 further comprising storing the information received from at least one of the toll transponder and the enforcement transponder.

14. The process of claim 13 wherein processing the information from the toll transponder to generate an output indicator signal comprises processing toll information from the toll transponder.

15. The process of claim 10 wherein providing the output indicator signal to an enforcement transponder comprises:

receiving an enforcement class value from the enforcement transponder;

in response to the reader receiving the enforcement class value from the enforcement transponder, computing a time value corresponding to the difference in time between the enforcement reader receiving information from the toll transponder and receiving the enforcement class value from the enforcement transponder; and in response to the time value being within a predetermined range of time values, providing to the enforcement transponder information related to the toll transponder.

16. A process for operating an enforcement transponder, the process comprising:

transmitting, from the enforcement transponder, an enforcement class value to an enforcement reader, receiving, by the enforcement transponder, information of interest to an enforcement agent from the enforcement reader reading a first transponder; and providing, using a signal, the information of interest received from the enforcement reader to the enforcement agent to determine an enforcement action associated with the first transponder.

17. The process of claim 16 in response to receiving transponder information from the enforcement reader, displaying information on a display.

18. The process of claim 17 wherein displaying information on a display includes providing an indication to the enforcement agent.

19. The system of claim 1 wherein the enforcement transponder is disposed with an enforcement vehicle.

20. The enforcement transponder of claim 6 wherein the enforcement transponder is disposed with an enforcement vehicle.

* * * * *

UNITED STATES PATENT AND TRADEMARK OFFICE

CERTIFICATE OF CORRECTION

PATENT NO. : 7,545,287 B2
APPLICATION NO. : 11/206554
DATED : June 9, 2009
INVENTOR(S) : Feldman et al.

It is certified that error appears in the above-identified patent and that said Letters Patent is hereby corrected as shown below:

Column 3, line 9-10, delete “transponder and the” and replace with --transponder the--.

Column 3, line 39-40, delete “roadway.allows enforcement agent to verify that an SoV user of an HOV lane not only has a valid” and replace with --roadway which allows enforcement agent to verify that an SoV user of an HOV lane not only has a valid--.

Column 4, line 10, delete “Transponder)” and replace with --transponder)--.

Column 4, line 33, delete “that the there is” and replace with --that there is--.

Column 5, line 58, delete “enters toll” and replace with --enters a toll--.

Column 6, line 55, delete “embodiment an” and replace with --embodiment of an--.

Column 7, line 18, delete “(and or” and replace with --(and/or--.

Column 9, line 11, delete “that the there” and replace with --that there--.

Column 9, line 14, delete “of automated” and replace with --of an automated--.

Column 9, line 18-19, delete “diamond shaped” and replace with --diamond-shaped--.

Column 9, line 44, delete “as whether” and replace with --as to whether--.

Column 10, line 16-17, delete “information.The” and replace with --information, the--.

Column 11, line 28, delete “to said the antenna;” and replace with --to the antenna--.

Signed and Sealed this

Twenty-fifth Day of August, 2009

David J. Kappos

David J. Kappos
*Director of the United States Patent and Trademark Office*